United States Patent
Watanabe (10) Patent No.: US 7,492,966 B2
(45) Date of Patent: Feb. 17, 2009

(54) IMAGE MAPPING METHOD AND IMAGE MAPPING PROGRAM

(75) Inventor: Katsuaki Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 591 days.

(21) Appl. No.: 11/147,378

(22) Filed: Jun. 8, 2005

(65) Prior Publication Data
US 2006/0007311 A1    Jan. 12, 2006

(30) Foreign Application Priority Data
Jun. 9, 2004    (JP) .............................. 2004-171336

(51) Int. Cl.
G06K 9/36 (2006.01)
G06K 9/32 (2006.01)
G06K 9/00 (2006.01)

(52) U.S. Cl. ...................................... 382/291; 382/298

(58) Field of Classification Search ................ 382/276, 382/291, 298, 100, 103; 348/143, 144; 345/629, 345/638, 619, 660, 667, 670; 701/213, 207
See application file for complete search history.

(56) References Cited

U.S. PATENT DOCUMENTS

| 6,133,947 A * | 10/2000 | Mikuni ........................ 348/143 |
| 6,437,797 B1 * | 8/2002 | Ota ............................ 345/638 |
| 6,995,792 B1 * | 2/2006 | Ogura ..................... 348/231.99 |
| 7,265,779 B2 * | 9/2007 | Sato et al. ................. 348/207.1 |
| 2004/0210382 A1 * | 10/2004 | Itabashi ....................... 701/202 |

FOREIGN PATENT DOCUMENTS

JP    9-34164 A    2/1997

* cited by examiner

Primary Examiner—Yon Couso
(74) Attorney, Agent, or Firm—Birch, Stewart, Kolasch & Birch, LLP (57) ABSTRACT

An image mapping method comprising the steps of acquiring a captured image as well as positional information of an image object in the captured image and positional information of an image taking position, reading map data containing the position of the image object from a recording medium that stores map data and displaying an electronic map based on the map data on a display device, displaying an indicator that shows the image taking direction of the image object on the electronic map based on the positional information of the image object in the captured image and the positional information of the image taking position, and displaying a marker that shows the position of the image object on the electronic map and disposing on the electronic map a scaled-down image of the captured image that is associated with the indicator showing the image taking direction that was shown on the electronic map.

31 Claims, 7 Drawing Sheets

TAG INFORMATION
(ATTACHED INFORMATION)

DATE AND TIME OF IMAGE-TAKING:
2/14/04, 12:31:10

IMAGE-TAKING MODE:NORMAL

TITLE"VACATION"

WHITE BALANCE:AUTO

FOCUS:MANUAL

ELECTRONIC FLASH:OFF

GPS:

THUMBNAIL
(160x120)

MAIN IMAGE
(XGA SIZE (1024x768 PIXELS))

FIG.3

| CLASSIFICATION | TAG NAME | FIELD NAME | TAG NUMBER Dec | TAG NUMBER Hex | TYPE | COUNT |
|---|---|---|---|---|---|---|
| A. GPS-RELATED TAG | | | | | | |
| | GPS TAG VERSION | GPSVersionID | 0 | 0 | BYTE | 4 |
| | NORTH LATITUDE (N) OR SOUTH LATITUDE (S) | GPSLatitudeRef | 1 | 1 | ASCII | 2 |
| | LATITUDE (NUMERICAL VALUE) | GPSLatitude | 2 | 2 | RATIONAL | 3 |
| | EAST LONGITUDE (E) OR WEST LONGITUDE (W) | GPSLongitudeRef | 3 | 3 | ASCII | 2 |
| | LONGITUDE (NUMERICAL VALUE) | GPSLongitude | 4 | 4 | RATIONAL | 3 |
| | ALTITUDE REFERENCE | GPSAltitudeRef | 5 | 5 | BYTE | 1 |
| | ALTITUDE (NUMERICAL VALUE) | GPSAltitude | 6 | 6 | RATIONAL | 1 |
| | GPS TIME (TIME OF ATOMIC CLOCK) | GPSTimeStamp | 7 | 7 | RATIONAL | 3 |
| | SATELLITE SIGNAL USED FOR POSITIONING | GPSSatellites | 8 | 8 | ASCII | Any |
| | STATUS OF GPS RECEIVER | GPSStatus | 9 | 9 | ASCII | 2 |
| | GPS MEASUREMENT MODE | GPSMeasureMode | 10 | A | ASCII | 2 |
| | RELIABILITY OF MEASUREMENT | GPSDOP | 11 | B | RATIONAL | 1 |
| | REFERENCE UNIT FOR SPEED | GPSSpeedRef | 12 | C | ASCII | 2 |
| | SPEED (NUMERICAL VALUE) | GPSSpeed | 13 | D | RATIONAL | 1 |
| | REFERENCE UNIT FOR TRACKING DIRECTION | GPSTrackRef | 14 | E | ASCII | 2 |
| | TRACKING DIRECTION (NUMERICAL VALUE) | GPSTrack | 15 | F | RATIONAL | 1 |
| | REFERENCE UNIT FOR DIRECTION OF CAPTURED IMAGE | GPSImgDirectionRef | 16 | 10 | ASCII | 2 |
| | DIRECTION OF CAPTURED IMAGE (NUMERICAL VALUE) | GPSImgDirection | 17 | 11 | ASCII | 1 |
| | MAP DATA FOR MEASUREMENT | GPSMapDatum | 18 | 12 | RATIONAL | Any |
| | NORTH LATITUDE (N) OR SOUTH LATITUDE (S) OF DESTINATION | GPSDestLatitdeRef | 19 | 13 | ASCII | 2 |
| | LATITUDE OF DESTINATION (NUMERICAL VALUE) | GPSDestLatitde | 20 | 14 | RATIONAL | 3 |
| | EAST LONGITUDE (E) OR WEST LONGITUDE (W) OF DESTINATION | GPSDestLongitudeRef | 21 | 15 | ASCII | 2 |
| | LONGITUDE OF DESTINATION (NUMERICAL VALUE) | GPSDestLongitude | 22 | 16 | RATIONAL | 3 |
| | REFERENCE UNIT FOR BEARING OF DESTINATION | GPSDestBeaningRef | 23 | 17 | ASCII | 2 |
| | BEARING OF DESTINATION (NUMERICAL VALUE) | GPsDestBeaning | 24 | 18 | RATIONAL | 1 |
| | REFERENCE UNIT FOR DISTANCE TO DESTINATION | GPSDestDistanceRef | 25 | 19 | ASCII | 2 |
| | DISTANCE TO DESTINATION (NUMERICAL VALUE) | GPSDestDistance | 26 | 1A | RATIONAL | 1 |
| | NAME OF MEASURING METHOD | GPSProcessingMethod | 27 | 1B | UNDEFINES | Any |
| | NAME OF MEASURING AREA | GPSAreaInformation | 28 | 1C | UNDIFINED | Any |
| | GPS DATE STAMP | GPSDateStamp | 29 | 1D | ASCII | 11 |
| | GPS DIFFERENTIAL MEASUREMENT | GPSDifferential | 30 | 1E | SHORT | 1 |

IMAGE MAPPING METHOD AND IMAGE MAPPING PROGRAM

BACKGROUND OF THE INVENTION

1. Field of the Invention

The present invention relates to an image mapping method and an image mapping program, and more particularly to technology that maps a captured image on an electronic map.

2. Description of the Related Art

A digital camera equipped with a GPS (Global Positioning System) device can record GPS information such as latitude and longitude that was determined by the GPS device with respect to a captured image.

An image reproduction method that maps thumbnail images of captured images of this kind in corresponding positions on an electronic map has already been proposed (Japanese Patent Application Laid Open No. 9-34164). This image reproduction method reads recorded GPS information that corresponds to each captured image, reads the desired map data from a recording medium that stores map data, displays an electronic map including the image taking positions of the captured images on a monitor, and displays a thumbnail of each of the captured images in corresponding positions on the electronic map based on the captured images and the read GPS information. Thus, the image taking positions of the captured images can be readily confirmed.

SUMMARY OF THE INVENTION

Although the image reproduction method disclosed in the aforementioned Japanese Patent Application Laid Open No. 9-34164 can display which image was taken at which location by use of thumbnail images disposed on an electronic map, there is a problem that the method cannot display information that shows from which direction the image of the image object was captured, and also the position of the image object.

This invention was made in view of the foregoing circumstances, and an object of this invention is to provide an image mapping method and an image mapping program that can display the direction from which an image of an image object was taken on an electronic map, and can also display the location of image taking positions and the image object on an electronic map.

In order to achieve the foregoing object, an image mapping method according to a first aspect of this invention comprises the steps of: acquiring a captured image as well as positional information of an image object in the captured image and positional information of an image taking position; reading map data containing the position of the image object from a recording medium that stores map data and displaying an electronic map based on the map data on a display device; displaying an indicator that shows the image taking direction of the image object on the electronic map based on the positional information of the image object in the captured image and the positional information of the image taking position, and displaying a marker on the electronic map that shows the position of the image object; and disposing on the electronic map a scaled-down image of the captured image that is associated with the indicator showing the image taking direction that was shown on the electronic map.

More specifically, the image mapping method acquires positional information of an image object in a captured image and positional information of the image taking position and, based on these two pieces of positional information, displays an indicator (arrows and line connecting the above-described two points) that shows the image taking direction of the image object on an electronic map that includes the position of the image object, displays a marker showing the position of the image object on the electronic map and also disposes on the electronic map a scaled-down image of the captured image that is associated with the indicator showing the image taking direction that was displayed on the electronic map. Thus, for an image which was mapped on an electronic map, the direction from which the image of the image object was captured can be easily grasped when viewing the electronic map and the position of the image object can also be grasped when viewing the electronic map.

A second aspect of this invention provides an image mapping method according to the first aspect, wherein the step of displaying the electronic map on a display device further comprises a step of reading map data containing the position of the image object and the image taking position, displaying an electronic map that is based on the map data on a display device, and displaying on the electronic map a marker showing the image taking position based on the acquired positional information for the image taking position. Thus, the image taking position of a captured image can also be grasped when viewing an electronic map.

A third aspect of this invention provides an image mapping method according to the first or second aspect, further comprising a step of determining an object distance based on the positional information of the image object in the captured image and the positional information of the image taking position, wherein the map data read from the recording medium is map data that is scaled in correspondence with the object distance. It is thus possible to utilize an electronic map that is scaled in correspondence with an object distance.

An image mapping method according to a fourth aspect of this invention comprises the steps of: acquiring a captured image as well as positional information of an image object in the captured image and information showing the image taking direction; reading map data containing the position of the image object from a recording medium that stores map data and displaying an electronic map that is based on the map data on a display device; displaying an indicator that shows the image taking direction of the image object on the electronic map based on the acquired positional information of the image object and image taking direction, and displaying a marker that shows the position of the image object on the electronic map; and disposing on the electronic map a scaled-down image of the captured image that is associated with the indicator showing the image taking direction displayed on the electronic map.

Although the first aspect of this invention acquires positional information of an image object and positional information of the image taking position in a captured image, the fourth aspect differs from the first aspect in that it acquires information showing the image taking direction of an image object in place of positional information of the image object. The fourth aspect is the same as the first aspect except for this difference.

An image mapping method according to a fifth aspect of this invention comprises the steps of: acquiring a captured image as well as positional information of an image object in the captured image and positional information of an image taking position; reading map data containing the position of the image object from a recording medium that stores map data, and displaying an electronic map that is based on the map data on a display device; and displaying an indicator that shows the image taking direction of the image object on the electronic map based on the positional information of the image object in the captured image and the positional information of the image taking position and disposing a scaled-down image of the captured image at a corresponding position on the electronic map.

The fifth aspect disposes a scaled-down image of a captured image at a corresponding position on an electronic map based on positional information for the image taking position and displays an indicator showing the image taking direction on an electronic map. Thus, the position from which a captured image was taken and the direction from which the image was taken can easily be confirmed from an electronic map.

An image mapping method according to a sixth aspect of this invention comprises the steps of: acquiring a captured image as well as positional information of an image taking position of the captured image and information showing the image taking direction; reading map data containing the image taking position from a recording medium that stores map data and displaying an electronic map that is based on the map data on a display device; displaying on the electronic map an indicator showing the image taking direction of the captured image based on the acquired information showing the image taking direction; and disposing a scaled-down image of the captured image at a corresponding position on the electronic map based on the acquired positional information for the image taking position.

The sixth aspect herein differs from the fourth aspect in that, instead of displaying a marker showing the position of an image object on an electronic map, a scaled-down image of the captured image is disposed on an electronic map at a location corresponding to the image taking position. The sixth aspect is the same as the fourth aspect in the other respects.

A seventh aspect of this invention provides an image mapping method according to any one of the first to sixth aspects, wherein the method has a step of displaying character information showing the image taking direction and the positional information of the image taking position on the electronic map.

An eighth aspect of this invention provides an image mapping method according to the first, fourth, fifth or sixth aspects, wherein the step of acquiring positional information of an image object in the captured image and positional information of the image taking position, the step of acquiring positional information of an image object in the captured image and information showing the image taking direction, or the step of acquiring positional information of the image taking position of the captured image and information showing the image taking direction, comprises reading information from a tag of an image file in which the captured image is stored.

A ninth aspect of this invention provides an image mapping method according to the eighth aspect, wherein the positional information of an image object in the captured image and positional information of the image taking position, the positional information of an image object in the captured image and information showing the image taking direction, or the positional information of the image taking position of the captured image and information showing the image taking direction is GPS information that was recorded on a tag of the image file. For example, this enables an electronic camera (including a mobile telephone with a camera function) equipped with a GPS device to record GPS information such as latitude and longitude that was determined by the GPS device on a tag of an image file to utilize the GPS information for mapping.

A tenth aspect of this invention provides an image mapping method according to any one of the first to ninth aspects, further comprising a step of acquiring a plurality of captured images in which images were taken of image objects having the same positional information, and a step of disposing each of the scaled-down images of the plurality of captured images on an electronic map. Thus, it is possible to map images of the same image object that were taken from various image taking directions on an electronic map and to confirm the respective image taking directions on the electronic map.

An image mapping program according to an eleventh aspect of this invention is a program that causes a computer to implement the functions of: acquiring a captured image as well as positional information of an image object in the captured image and positional information of an image taking position; reading map data containing the position of the image object from a recording medium that stores map data and displaying an electronic map that is based on the map data on a display device; displaying an indicator that shows the image taking direction of the image object on the electronic map based on the acquired recorded positional information of the image object and the positional information of the image taking position and displaying a marker that shows the position of the image object on the electronic map; and disposing on the electronic map a scaled-down image of the captured image that is associated with the indicator showing the image taking direction that was displayed on the electronic map.

An image mapping program according to a twelfth aspect of this invention is a program that causes a computer to implement the functions of: acquiring a captured image as well as positional information of an image object in the captured image and information showing the image taking direction; reading map data containing the position of the image object from a recording medium that stores map data and displaying an electronic map that is based on the map data on a display device; displaying an indicator that shows the image taking direction of the image object on the electronic map based on the acquired positional information and image taking direction of the image object and displaying a marker that shows the position of the image object on the electronic map; and disposing on the electronic map a scaled-down image of the captured image that is associated with the indicator showing the image taking direction that was displayed on the electronic map.

An image mapping program according to a thirteenth aspect of this invention is a program that causes a computer to implement the functions of: acquiring a captured image as well as positional information of an image object in the captured image and positional information of an image taking position; reading map data containing the position of the image object from a recording medium that stores map data and displaying an electronic map that is based on the map data on a display device; and displaying an indicator that shows the image taking direction of the captured image on the electronic map based on the acquired positional information of the image object and positional information of the image taking position and disposing a scaled-down image of the captured image at a corresponding position on the electronic map.

An image mapping program according to a fourteenth aspect of this invention is a program that causes a computer to implement the functions of: acquiring a captured image as well as positional information of the image taking position in the captured image and information showing the image taking direction; reading map data containing the image taking position from a recording medium that stores map data and displaying an electronic map that is based on the map data on a display device; displaying on the electronic map an indicator showing the image taking direction of the captured image based on the acquired information showing the image taking direction; and disposing a scaled-down image of the captured image at a corresponding position on the electronic map based on the acquired positional information of the image taking position.

According to this invention, since a scaled-down image of a captured image can be disposed on an electronic map and an indicator showing the image taking direction can also be displayed thereon based on two pieces of positional information that indicate two locations of an image object and the image taking position, or based on positional information of the image taking position and information showing the image taking direction, the direction from which an image of an image object was taken can be easily grasped on the electronic map. Further, the position of the image object and the image taking position can also be easily grasped on the electronic map.

BRIEF DESCRIPTION OF THE DRAWINGS

FIG. 3 is a chart showing attached information relating to GPS in Exif (exchangeable image file format) file stipulations for digital cameras;

DETAILED DESCRIPTION OF THE PREFERRED EMBODIMENTS

Preferred embodiments of the image mapping method and image mapping program of this invention are described hereunder referring to the attached drawings.

Figure 1:
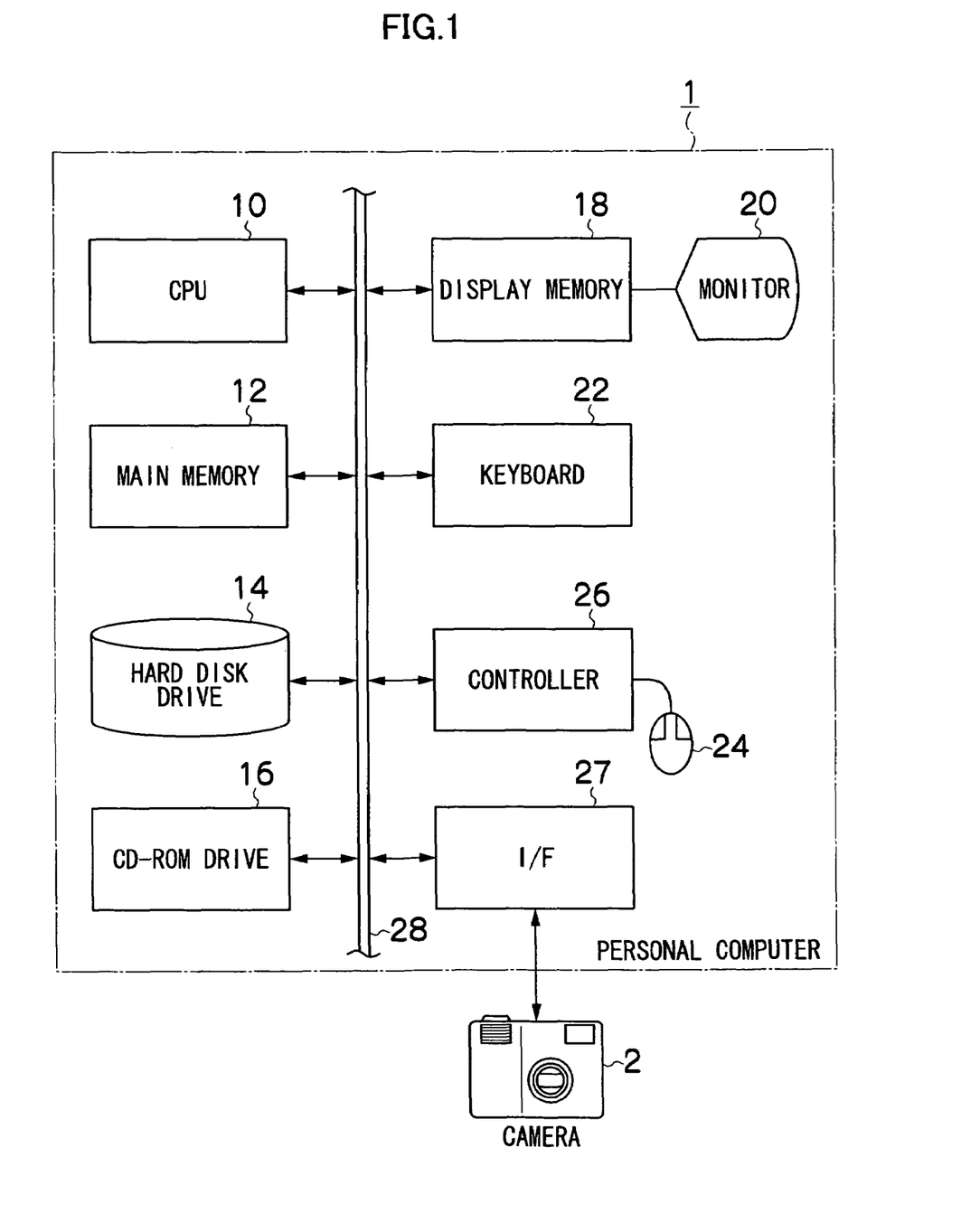
FIG. 1 is a block diagram showing an example of the hardware configuration of a personal computer that operates according to an image mapping program of this invention.

FIG. 1 is a block diagram showing an example of the hardware configuration of a personal computer that operates according to an image mapping program of this invention.

As shown in FIG. 1, a personal computer 1 is principally composed of a central processing unit (CPU) 10 that controls the operations of each component therein; a main memory 12 in which control programs of the device are stored and which serves as a work area when executing a program; a hard disk drive 14 on which are stored the operating system (OS) of the personal computer 1, device drivers for peripheral devices connected to the personal computer 1, various kinds of application software including the image mapping program of this invention, images of the user, and map data for an entire country and the like; a CD-ROM drive 16; a display memory 18 that temporarily stores data for display; a monitor device 20 such as a CRT monitor or a liquid crystal monitor that displays images, characters, maps and the like based on image data, character data, map data or the like from the display memory 18; a keyboard 22; a mouse 24 that is utilized as a locator; a mouse controller 26 that detects the state of the mouse 24 and outputs signals such as a signal indicating the position of the mouse pointer on the monitor device 20 or the state of the mouse 24 to the CPU 10; an interface 27 such as a USB (Universal Serial Bus) that can connect with a digital camera 2 to enable the input of image data and the like; and a bus 28 connecting the aforementioned components.

With the exception of the image mapping program of this invention that is stored in the hard disk drive 14, the personal computer 1 having the above configuration is a known apparatus, and a detailed description of each component is thus omitted herein. The image mapping program can be installed in the personal computer 1 by placing a CD-ROM on which the image mapping program is recorded in the CD-ROM drive 16 of the personal computer 1.

Next, an image file stored on a memory card of the digital camera 2 that is connected to the personal computer 1 through the interface 27 or on the hard disk drive 14 of the personal computer 1 will be described.

The digital camera 2 is equipped with a GPS device (not shown in the figure), and is configured so that GPS information such as the latitude and longitude of an image taking position that was determined by the GPS device at the time of image-taking can be recorded together with the captured image.

Figure 2:
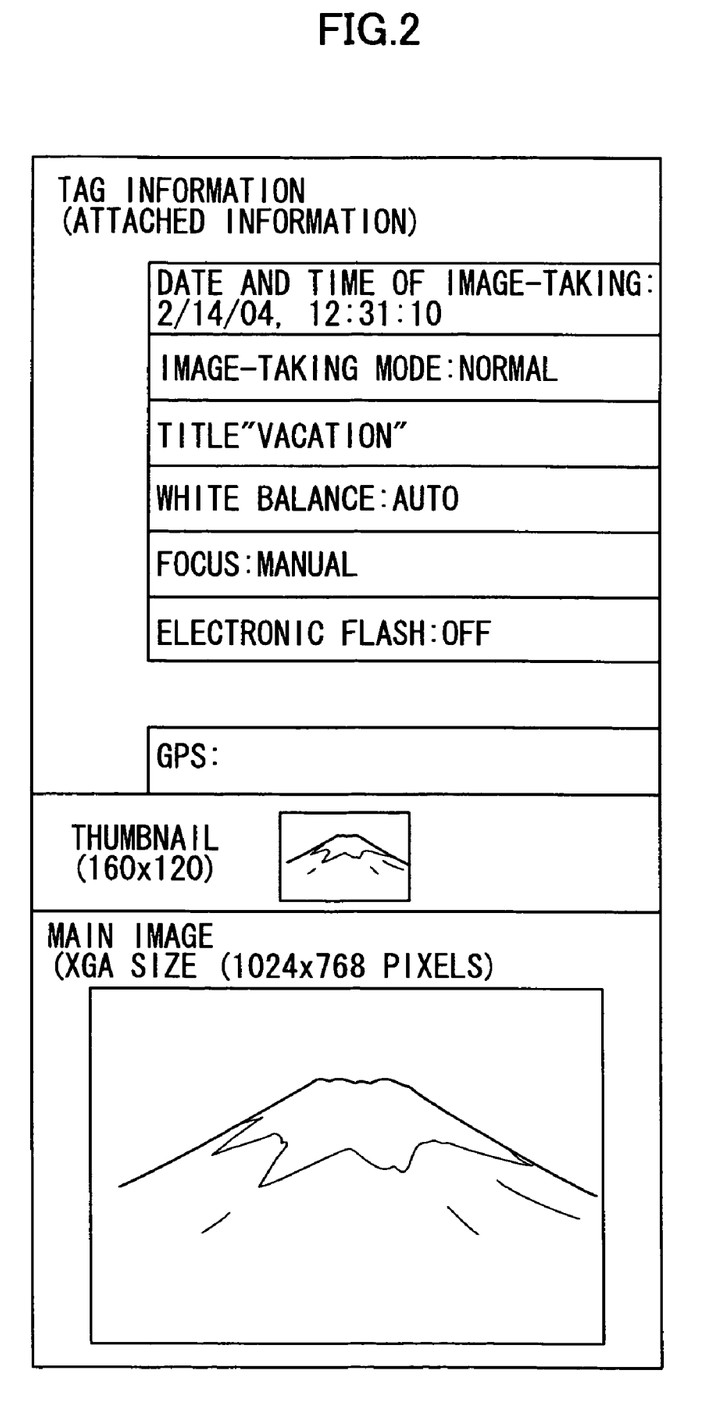
FIG. 2 is a structural drawing of a file that shows one example of an image file in which an image taken by a digital camera or the like is stored.

FIG. 2 illustrates one example of an image file in which an image and the like taken by the digital camera 2 is recorded. As shown in the figure, image-taking information such as an image-taking time stamp that shows the time an image was taken as well as tag information such as GPS information acquired from the GPS device is recorded on the tag of the image file. Further, a thumbnail image in which the captured image (principle image) has been reduced is also recorded on the tag.

FIG. 3 shows attached information relating to GPS in Exif (exchangeable image file format) file stipulations for digital cameras (cited from Exif 2.2).

The digital camera 2 enables input of positional information (GPS information) of an image object, and the input GPS information of the image object is recorded on the tag of the image file together with GPS information of the image taking position. Examples of a method for inputting the GPS information of an image object include a method in which the digital camera 2 is moved to the position of the image object and the GPS information is then input from the GPS device, a method in which a map is displayed on a monitor (not shown in the figure) of the digital camera 2 to input the GPS information of the image object by specifying the image object on the displayed map, and a method in which numerical information of the latitude and longitude of the image object is input.

Figure 4:
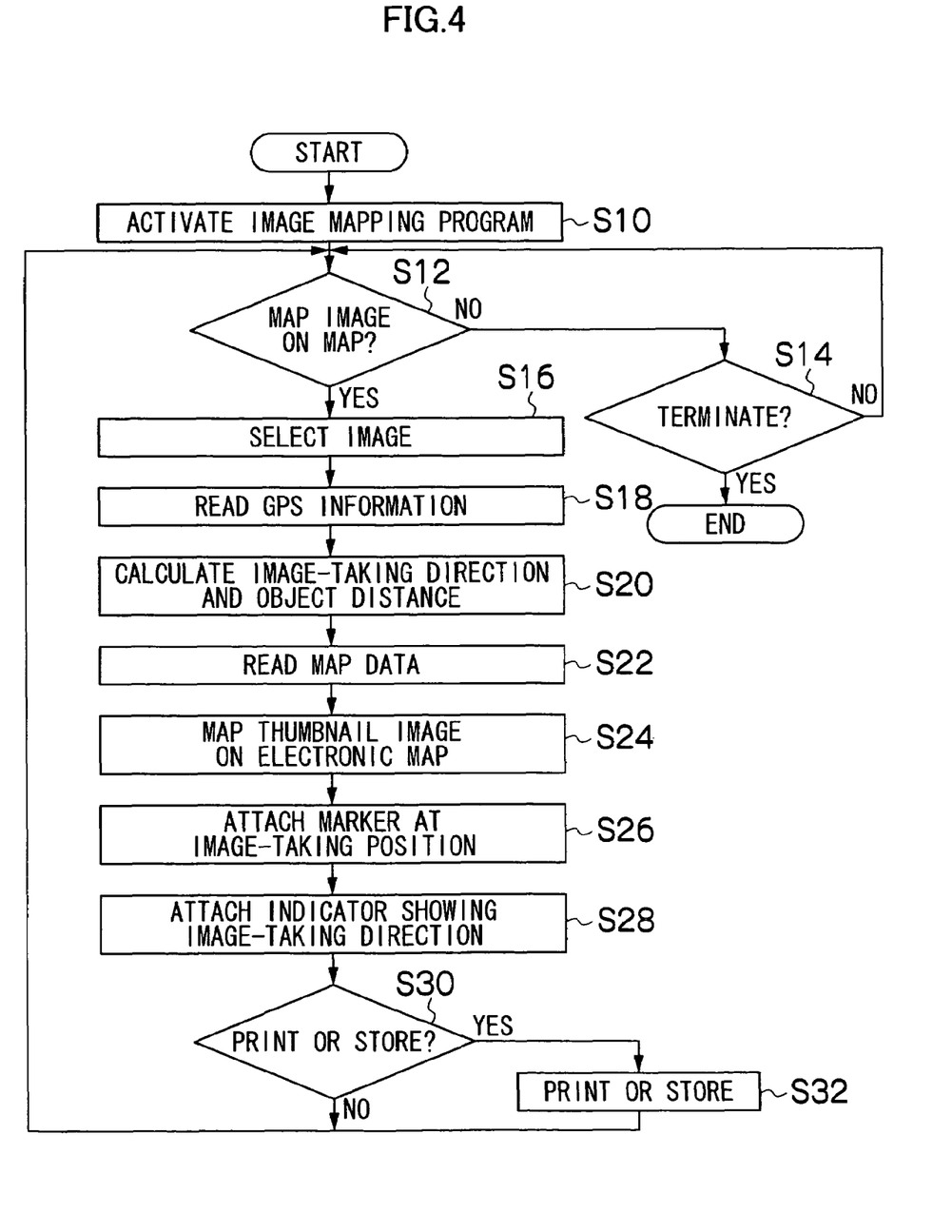
FIG. 4 is a flowchart showing one example of the procedures of an image mapping method according to this invention.

Next, procedures that illustrate the image mapping method of this invention will be described referring to the flowchart shown in FIG. 4.

(Step S10)

First, the image mapping program of this invention is activated. The image mapping program may be included in electronic map software or may be linked to electronic map software. When the image mapping program is activated, default map data is read from the hard disk drive 14 and an electronic map that is based on this map data is displayed on the monitor device 20. In this connection, the most recently used map data can be set as the default map data.

(Step S12)

Next, a decision is made as to whether or not to map a captured image on the electronic map. When an instruction to map a captured image is not input the operation proceeds to step S14, and when an instruction to map a captured image is input the operation proceeds to step S16.

(Step S14)

In this step, a decision is made as to whether or not to terminate the image mapping program. When an instruction to terminate the program has not been input the operation returns to step S12, and when an instruction to terminate the program has been input the image mapping program is terminated.

(Step S16)

In step S16, a captured image to be mapped onto the electronic map is selected. Selection of the captured image is carried out by selecting the appropriate image from images stored on a memory card of the digital camera 2 that is connected to the personal computer 1 or on the hard disk drive 14 of the personal computer 1.

(Step S18)

Here, GPS information is read from a tag of the image file on which the image selected in step S16 is recorded. As described in FIG. 2 and FIG. 3, this GPS information includes the position of the image object (latitude and longitude) and of the image taking position (latitude and longitude).

(Step S20)

Next, the direction in which an image of the image object was taken from the image taking position and the object distance is calculated based on the latitude and longitude of the image object and the latitude and longitude of the image taking position.

(Step S22)

Based on the latitude and longitude of the image object and the latitude and longitude of the image taking position, map data that includes these two locations, i.e., that of the image object and the image taking position, is read from the hard disk drive 14 to display an electronic map based on this map data on the monitor device 20. Further, the map data is scaled in correspondence with the object distance that was calculated in step S20.

(Step S24)

In this step, a scaled-down image (thumbnail image) of the captured image that was selected in step S16 is mapped at a position corresponding to the image taking position on the electronic map displayed on the monitor device 20.

Figure 5:
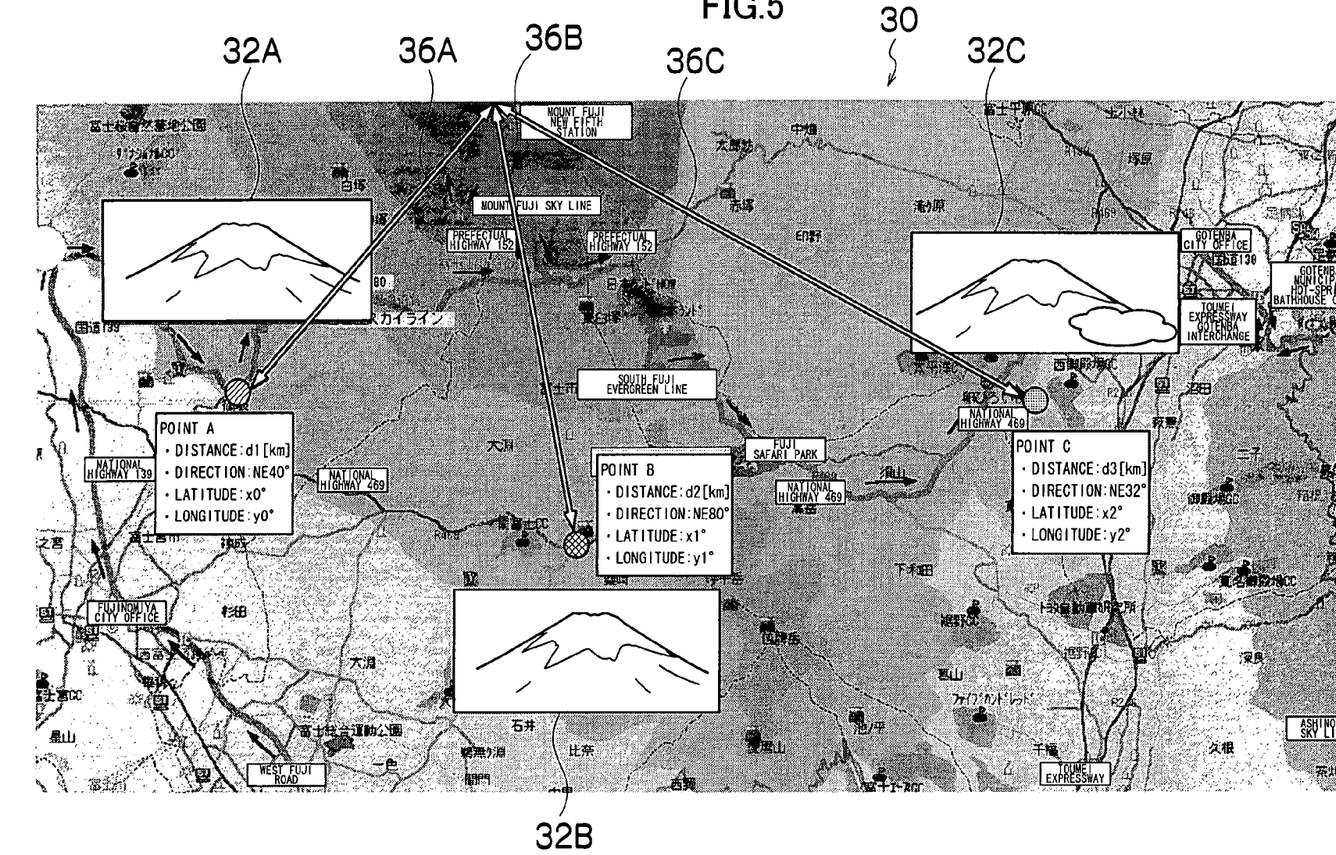
FIG. 5 is a view showing one example of the screen of a monitor on which an electronic map according to this invention is displayed.

FIG. 5 shows an example of a screen displayed on the monitor device 20. As shown in the figure, on the monitor device 20 are displayed an electronic map 30 that includes an image object (in this example, Mount Fuji) and image taking positions, as well as thumbnail images 32A, 32B and 32C that were mapped at positions corresponding to image taking positions A, B and C.

(Step S26)

Next, markers showing the image taking positions are attached to the electronic map. In FIG. 5, markers 34A, 34B and 34C are attached at the image taking positions A, B and C, respectively. The markers 34A, 34B and 34C enable the image taking positions for the respective thumbnail images 32A, 32B and 32C to be grasped when viewing the electronic map 30.

A marker may also be attached at the position of the image object (in this example, the top of Mount Fuji).

(Step S28)

Here, an indicator showing the image taking direction of the image object is attached to the electronic map. As shown in FIG. 5, the position of the image object (the top of Mount Fuji) and the markers 34A, 34B and 34C showing the image taking positions A, B and C are joined by arrowed lines 36A, 36B and 36C. The direction in which the images of the image object was taken from the image taking positions A, B and C can be confirmed from these arrowed lines 36A, 36B and 36C.

Further, as shown in FIG. 5, at each of the image taking positions A, B and C on the electronic map 30 is displayed character information that shows GPS information for the image taking position as well as the image taking direction and the object distance that were calculated in step S20.

(Step S30)

Next, a decision is made as to whether or not to print the electronic map on which the images were mapped or to store the data. When an instruction is input to print or store the data, the operation proceeds to step S32, and when an instruction is not input to print or store the data, the operation returns to step S12.

(Step S32)

In this step, the electronic map on which the images were mapped is printed by a printer (not shown in the figure) connected to the personal computer 1 or is stored on the hard disk drive 14. Thereafter, the operation returns to step S12.

When a GPS device is equipped with a magnetic compass or the like, information showing the image taking direction may also be recorded as GPS information on a tag of an image file. Further, some GPS devices have a function that calculates the direction of a straight line connecting two points on the basis of the latitude and longitude of the two points (for example, points that are several meters apart), and this direction may also be recorded as the image taking direction on a tag of an image file. This information that shows the image taking direction can be utilized when displaying an indicator that shows the image taking direction of an image which was mapped on an electronic map.

In this embodiment, although GPS information showing the position of an image object and an image taking position is read from a tag of an image file, the present invention is not limited thereto. For example, since GPS information (latitude and longitude information) for an image object specifies the position of the image object on an electronic map, a configuration may also be employed in which the latitude and longitude information of the specified position is acquired from a map database of the electronic map. Further, GPS information of an image taking position may similarly be acquired from a map database.

Figure 6:
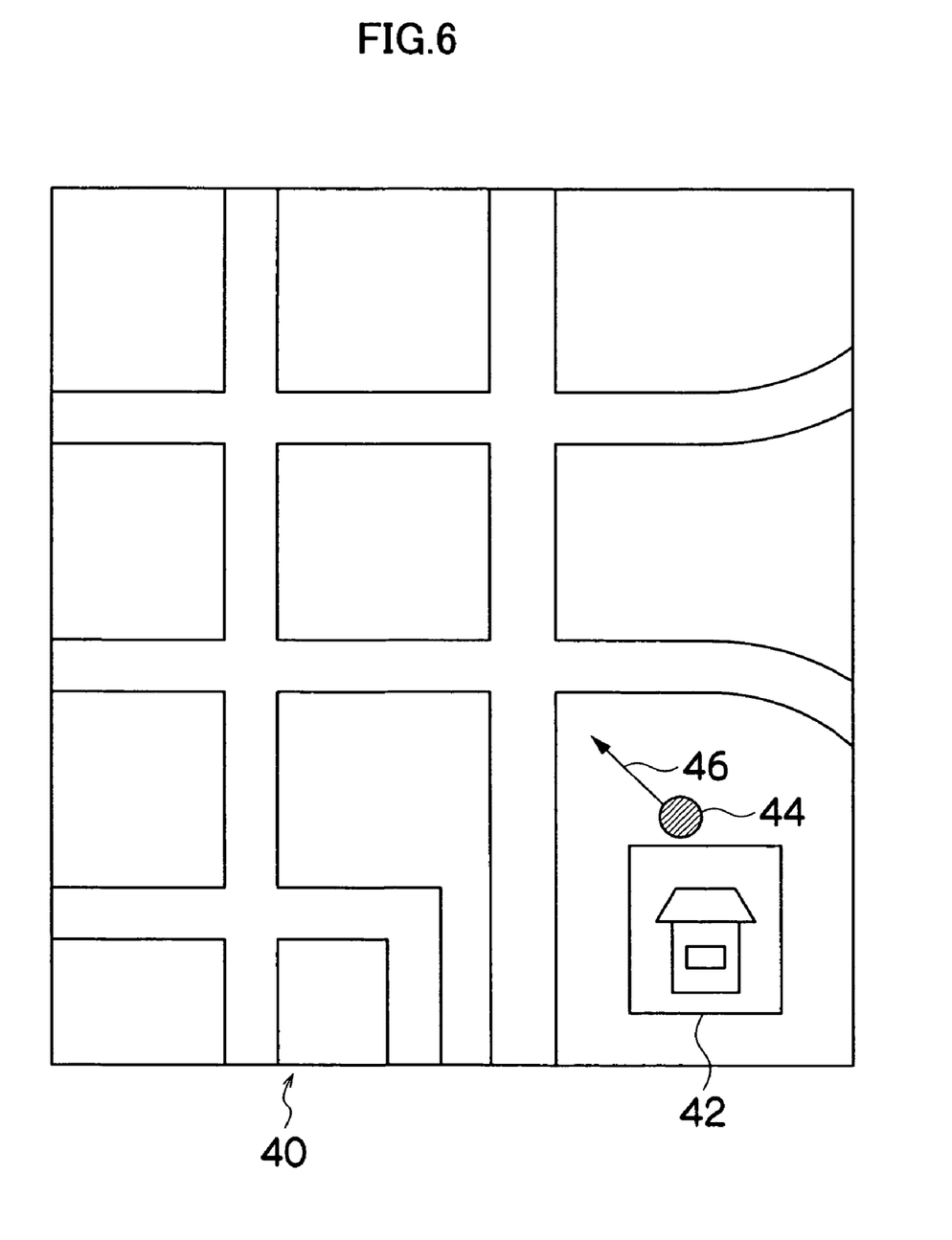
FIG. 6 is a schematic diagram of an electronic map used to explain another embodiment of the image mapping method according to this invention.

FIG. 6 is a schematic diagram of an electronic map that is used to explain another embodiment of the image mapping method according to this invention.

In the figure, reference numeral 40 designates an electronic map, reference numeral 42 designates a thumbnail image, reference numeral 44 designates a marker showing an image taking position, and reference numeral 46 designates an indicator (arrow) showing the image taking direction.

The electronic map 40 shown in FIG. 6 differs from the electronic map 30 shown in FIG. 5 in that the position of the image object is not displayed on the electronic map 40 shown in FIG. 6. This display of the electronic map 40 can be carried out by acquiring positional information of the image taking position and information showing the image taking direction from the image taking position, in addition to the captured image.

For the electronic map 40 shown in FIG. 6 also, an image taking position can be confirmed on an electronic map, and the image taking direction from that image taking position can also be confirmed.

Figure 7:
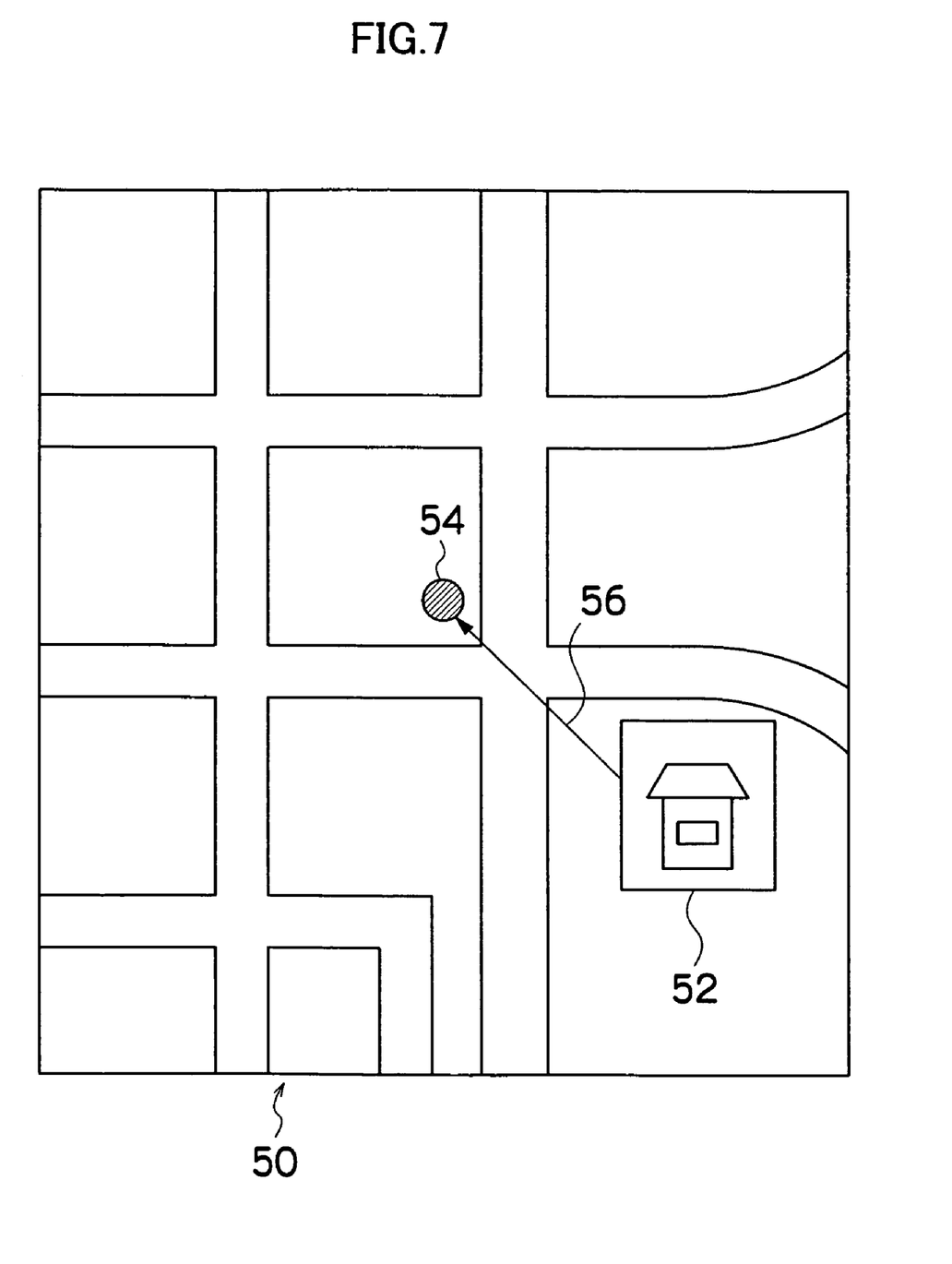
FIG. 7 is a schematic diagram of an electronic map used to explain a further another embodiment of the image mapping method according to this invention.

FIG. 7 is a schematic diagram of an electronic map that is used to explain a further embodiment of the image mapping method according to this invention.

In the figure, reference numeral 50 designates an electronic map, reference numeral 52 designates a thumbnail image, reference numeral 54 designates a marker showing the position of an image object, and reference numeral 56 designates an indicator (arrow) showing the image taking direction.

The electronic map 50 shown in FIG. 7 differs from the electronic map 30 shown in FIG. 5 in that the image taking position is not displayed on the electronic map 50 shown in FIG. 7. This display of the electronic map 50 can be carried out by acquiring positional information of the image object and information showing the direction in which the image of the image object was taken, in addition to the captured image.

For the electronic map 50 shown in FIG. 7 also, the position of an image object can be confirmed on an electronic map and the direction in which the image of the image object was taken can also be confirmed. For example, this can be applied to the mapping of images in a case in which images of a construction site (image object) are taken from various directions.

Although this embodiment was described using an example of a personal computer, an image mapping function according to this invention can also be installed on a personal digital assistant (PDA), a digital camera, a mobile telephone with a camera function, a navigation system and the like.

What is claimed is:

1. An image mapping method comprising:
acquiring a captured image as well as positional information of an image object in the captured image and positional information of an image taking position;
reading map data containing the position of the image object from a recording medium that stores map data and displaying an electronic map based on the map data on a display device;
displaying an indicator that shows an image taking direction of the image object on the electronic map based on the positional information of the image object in the captured image and the positional information of the image taking position, and displaying a marker that shows the position of the image object on the electronic map; and
disposing on the electronic map a scaled-down image of the captured image that is associated with the indicator showing the image taking direction that was shown on the electronic map.

2. The image mapping method according to claim 1, wherein displaying an electronic map on a display device comprises:
reading map data containing the position of the image object and the image taking position, displaying an electronic map that is based on the map data on a display device, and displaying on the electronic map a marker showing the image taking position based on the acquired positional information of the image taking position.

3. The image mapping method according to claim 1, further comprising:
determining an object distance based on the positional information of the image object in the captured image and the positional information of the image taking position, wherein the map data read from the recording medium is map data that is reduced in scale in correspondence with the object distance.

4. The image mapping method according to claim 2, further comprising:
determining an object distance based on the positional information of the image object in the captured image and the positional information of the image taking position, wherein the map data read from the recording medium is map data that is reduced in scale in correspondence with the object distance.

5. An image mapping method comprising:
acquiring a captured image as well as positional information of an image object in the captured image and information showing an image taking direction;
reading map data containing the position of the image object from a recording medium that stores map data and displaying an electronic map that is based on the map data on a display device;
displaying an indicator that shows the direction in which the image of the image object was taken on the electronic map based on the acquired positional information of the image object and image taking direction, and also displaying a marker tat shows the position of the image object on the electronic map; and
disposing on the electronic map a scaled-down image of the captured image that is associated with the indicator showing the image taking direction displayed on the electronic map.

6. An image mapping method comprising:
acquiring a captured image as well as positional information of an image object in the captured image and positional information of an image taking position;
reading map data containing the position of the image object from a recording medium that stores map data and displaying an electronic map that is based on the map data on a display device; and
displaying an indicator that shows an image taking direction of the image object on the electronic map based on the positional information of the image object in the captured image and the positional information of the image taking position, and also disposing a scaled-down image of the captured image at a corresponding position on the electronic map.

7. An image mapping method comprising:
acquiring a captured image as well as positional information of an image taking position of the captured image and information showing an image taking direction;
reading map data containing the image taking position from a recording medium that stores map data and displaying an electronic map that is based on the map data on a display device;
displaying on the electronic map an indicator showing the image taking direction of the captured image based on the acquired information showing the image taking direction; and
disposing a scaled-down image of the captured image at a corresponding position on the electronic map based on the acquired positional information of the image taking position.

8. The image mapping method according to claim 1, further comprising:
displaying character information showing the image taking direction and the positional information of the image taking position on the electronic map.

9. The image mapping method according to claim 4, further comprising:
displaying character information showing the image taking direction and the positional information of the image taking position on the electronic map.

10. The image mapping method according to claim 5, further comprising:
displaying character information showing the image taking direction on the electronic map.

11. The image mapping method according to claim 6, further comprising:
   displaying character information showing the image taking direction and the positional information of the image taking position on the electronic map.

12. The image mapping method according to claim 1 wherein acquiring positional information of an image object in the captured image and positional information of an image taking position, acquiring positional information of an image object in the captured image and information showing an image taking direction, or acquiring positional information of an image taking position of the captured image and information showing an image taking direction comprises:
   reading information from a tag of an image file on which the captured image is recorded.

13. The image mapping method according to claim 4 wherein acquiring positional information of an image object in the captured image and positional information of an image taking position, acquiring positional information of an image object in the captured image and information showing an image taking direction, or acquiring positional information of an image taking position of the captured image and information showing an image taking direction comprises:
   reading information from a tag of an image file on which the captured image is recorded.

14. The image mapping method according to claim 5 wherein acquiring positional information of an image object in the captured image and positional information of an image taking position, acquiring positional information of an image object in the captured image and information showing an image taking direction, or acquiring positional information of an image taking position of the captured image and information showing an image taking direction comprises:
   reading information from a tag of an image file on which the captured image is recorded.

15. The image mapping method according to claim 6 wherein acquiring positional information of an image object in the captured image and positional information of an image taking position, acquiring positional information of an image object in the captured image and information showing an image taking direction, or acquiring positional information of an image taking position of the captured image and information showing an image taking direction comprises:
   reading information from a tag of an image file on which the captured image is recorded.

16. The image mapping method according to claim 8, wherein the positional information of an image object in the captured image and the positional information of the image taking position, the positional information of an image object in the captured image and information showing the image taking direction, or the positional information of the image taking position of the captured image and information showing the image taking direction, is GPS information that was recorded on a tag of the image file.

17. The image mapping method according to claim 9, wherein the positional information of an image object in the captured image and the positional information of the image taking position, the positional information of an image object in the captured image and information showing the image taking direction, or the positional information of the image taking position of the captured image and information showing the image taking direction, is GPS information that was recorded onthe a tag of the image file.

18. The image mapping method according to claim 10, wherein the positional information of an image object in the captured image and the positional information of the image taking position, the positional information of an image object in the captured image and information showing the image taking direction, or the positional information of the image taking position of the captured image and information showing the image taking direction, is GPS information that was recorded on a tag of the image file.

19. The image mapping method according to claim 11, wherein the positional information of an image object in the captured image and the positional information of the image taking position, the positional information of an image object in the captured image and information showing the image taking direction, or the positional information of the image taking position of the captured image and information showing the image taking direction, is GPS information that was recorded on a tag of the image file.

20. The image mapping method according to claim 1, further comprising:
   acquiring a plurality of captured images in which images were taken of image objects having the same positional information, and a step of disposing each of the scaled-down images of the plurality of captured images on the same electronic map.

21. The image mapping method according to claim 4, further comprising:
   acquiring a plurality of captured images in which images were taken of image objects having the same positional information, and a step of disposing each of the scaled-down images of the plurality of captured images on the same electronic map.

22. The image mapping method according to claim 5, further comprising:
   acquiring a plurality of captured images in which images were taken of image objects having the same positional information, and a step of disposing each of the scaled-down images of the plurality of captured images on the same electronic map.

23. The image mapping method according to claim 6, further comprising:
   acquiring a plurality of captured images in which images were taken of image objects having the same positional information, and a step of disposing each of the scaled-down images of the plurality of captured images on the same electronic map.

24. A computer-readable storage medium having embodied thereon an image mapping program that, when executed, performs an image mapping method comprising:
   acquiring a captured image as well as positional information of an image object in the captured image and positional information of an image taking position;
   reading map data containing the position of the image object from a recording medium that stores map data and displaying an electronic map that is based on the map data on a display device;
   displaying an indicator that shows an image taking direction of the image object on the electronic map based on the acquired recorded positional information of the image object and positional information of the image taking position, and displaying a marker that shows the position of the image object on the electronic map; and
   disposing on the electronic map a scaled-down image of the captured image that is associated with the indicator showing the image taking direction that was displayed on the electronic map.

25. A computer-readable storage medium having embodied thereon an image mapping program that, when executed, performs an image mapping method comprising:

acquiring a captured image as well as positional information of an image object in the captured image and information showing an image taking direction;

reading map data containing the position of the image object from a recording medium that stores map data and displaying an electronic map that is based on the map data on a display device;

displaying an indicator that shows the image taking direction of the image object on the electronic map based on the acquired positional information and image taking direction of the image object, and displaying a marker that shows the position of the image object on the electronic map; and disposing on the electronic map a scaled-down image of the captured image that is associated with the indicator showing the image taking direction that was displayed on the electronic map.

26. A computer-readable storage medium having embodied thereon an image mapping program that, when executed, performs an image mapping method comprising:

acquiring a captured image as well as positional information of an image object in the captured image and positional information of an image taking position;

reading map data containing the position of the image object from a recording medium that stores map data and displaying an electronic map that is based on the map data on a display device; and displaying an indicator that shows an image taking direction of the captured image on the electronic map based on the acquired positional information of the image object and positional information of the image taking position, and disposing a scaled-down image of the captured image at a corresponding position on the electronic map.

27. A computer-readable storage medium having embodied thereon an image mapping program that, when executed, performs an image mapping method comprising:

acquiring a captured image as well, as positional information of an image taking position in the captured image and information showing an image taking direction;

reading map data containing the image taking position from a recording medium that stores map data and displaying an electronic map tat is based on the map data on a display device;

displaying on the electronic map an indicator showing the image taking direction of the captured image based on the acquired information showing the image taking direction; and disposing a scaled-down image of the captured image at a corresponding position on the electronic map based on the acquired positional information of the image taking position.

28. The image mapping method according to claim 1, further comprising:

displaying information showing the image taking direction and the distance between the position of the image object and the image taking position on the electronic map.

29. The image mapping method according to claim 4, further comprising:

displaying information showing the image taking direction and the distance between the position of the image object and the image taking position on the electronic map.

30. The image mapping method according to claim 6, further comprising:

displaying information showing the image taking direction and the distance between the position of the image object and the image taking position on the electronic map.

31. The image mapping method according to claim 7, further comprising:

displaying character information showing the image taking direction on the electronic map.

* * * * *